(12) United States Patent
Houssian

(10) Patent No.: US 8,746,439 B2
(45) Date of Patent: Jun. 10, 2014

(54) FEED AUGER ASSEMBLY COMPRISING CONCENTRIC AUGER SECTIONS

(75) Inventor: Terry Douglas Houssian, Regina (CA)

(73) Assignee: Meridian Manufacturing Inc., Winnipeg, Manitoba (CA)

( * ) Notice: Subject to any disclaimer, the term of this patent is extended or adjusted under 35 U.S.C. 154(b) by 0 days.

(21) Appl. No.: 13/605,130

(22) Filed: Sep. 6, 2012

(65) Prior Publication Data

US 2013/0243552 A1 Sep. 19, 2013

Related U.S. Application Data

(60) Provisional application No. 61/531,468, filed on Sep. 6, 2011.

(51) Int. Cl.
*B65G 33/26* (2006.01)

(52) U.S. Cl.
USPC .......................................... 198/660; 198/661

(58) Field of Classification Search
USPC ........................ 198/660, 661, 666, 588, 812
See application file for complete search history.

(56) References Cited

U.S. PATENT DOCUMENTS

| | | | | |
|---|---|---|---|---|
| 2,290,806 A | * | 7/1942 | Hodgin | 198/666 |
| 2,845,167 A | * | 7/1958 | Heiken | 198/660 |
| 4,014,431 A | * | 3/1977 | Angeletti et al. | 198/660 |
| 4,356,910 A | * | 11/1982 | Togstad | 198/660 |
| 4,603,775 A | | 8/1986 | Plett | |
| 4,963,066 A | | 10/1990 | Boppart | |
| 5,184,715 A | | 2/1993 | Feterl | |
| 5,305,866 A | | 4/1994 | Stewart et al. | |
| 5,746,303 A | * | 5/1998 | Niewold | 198/660 |
| 5,788,055 A | | 8/1998 | Stewart et al. | |
| 5,871,081 A | * | 2/1999 | Gaalswyk et al. | 198/662 |
| 7,191,889 B1 | | 3/2007 | Heley | |
| 7,381,131 B1 | | 6/2008 | Harpole | |
| 7,428,956 B2 | | 9/2008 | Scherman | |

* cited by examiner

*Primary Examiner* — James R Bidwell
(74) *Attorney, Agent, or Firm* — Ryan W. Dupuis; Kyle R. Satterthwaite; Ade & Company Inc

(57) ABSTRACT

A feed auger assembly which conveys particular material to an implement includes a first auger housing with a first auger flight rotatable therein, a second auger housing concentrically receiving the first auger housing therein so as to define an annular space therebetween, and a second auger flight rotatable within the annular space. The discharge end of the first auger housing is arranged to discharge into the annular space between the intermediate end and the outlet end of the second auger housing as the first auger housing is longitudinally slidable relative to the second auger housing in the longitudinal direction. The distance between the inlet end of first auger housing and the outlet end of the second auger housing is thus adjustable during a conveying operation of the augers being rotated within the respective housings.

20 Claims, 4 Drawing Sheets

FEED AUGER ASSEMBLY COMPRISING CONCENTRIC AUGER SECTIONS

This application claims the benefit under 35 U.S.C.119(e) of U.S. provisional application Ser. No. 61/531,468, filed Sep. 6, 2011.

FIELD OF THE INVENTION

The present invention relates to a feed auger assembly for a conveyor assembly including a main conveyor into which the feed auger assembly is arranged to load particulate material, and more particularly the present invention relates to a feed auger assembly includes two auger sections which are telescopically slidable relative to one another to vary a length of the feed auger assembly.

BACKGROUND

It is common to use grain augers and the like to transfer grain or other particulate material from a source area to a target area, for example from a transport container to a bin or other storage type container. Transport containers generally involve a container supported for rolling movement along the ground by wheels spaced apart at opposing ends of the container. A hopper type discharge is then typically located between the wheels below the container for discharging into the auger which subsequently conveys the material to the storage container.

U.S. Pat. No. 5,184,715 to Feterl; U.S. Pat. Nos. 5,305,866 and 5,788,055 both to Stewart et al; U.S. Pat. No. 4,963,066 to Boppart; U.S. Pat. No. 4,603,775 to Plett; and U.S. Pat. No. 7,191,889 to Heley; and European Patent Application 0 684 198 disclose various examples of grain augers used for conveying particulate materials. In each instance a main auger is supported on a wheeled frame for positioning of the discharge in alignment with the target area. A swing auger is provided at the inlet of the main auger for alignment with the source area. The hopper at the inlet of the swing auger however is restricted to positioning along an arced path which is difficult to align with the discharge hopper of a transport container. Often due to the narrow space between wheel sets within which a discharge hopper on a transport container is located, it is not possible to displace the swing auger is an arcing motion under the transport container parked beside the main auger without multiple steps of advancing and subsequent reversal of the vehicle position for proper alignment with the discharge hopper on the vehicle with the inlet hopper on the swing auger. The swing augers are thus difficult and time consuming to set up and may result in lost material being transferred due to its poor alignment.

U.S. Pat. No. 7,428,956 by Scherman discloses an improved feed auger assembly for a conveyor including first and second auger sections which are pivotal relative to one another allowing the loading hopper to be placed through an infinite number of positions about the inlet end of the main auger; however the resulting assembly is awkwardly quite large and includes a large number of parts to control the pivoting movement of the two auger sections.

Canadian Patent 2,398,015 discloses a telescopic feed assembly using belts; however there are no means disclosed for applying a telescopic feed assembly using augers to take advantage of the benefits of augers over belt conveyors.

International application WO2010/048695 discloses a feed auger assembly which telescopically supported in relation to an implement such as a main auger to which the feed auger is coupled; however the auger is only operable within a small portion of the full range of motion of the feed auger assembly.

Canadian Patent 1,137,915 by Togstad and U.S. Pat. No. 7,381,131 disclose examples of extendible augers. Both augers are limited in their application and are not suited for use in a swing auger assembly of an agricultural conveyor for example.

Canadian Patent Application 2,723,498 by Sanders discloses an extendible feed auger assembly for an agricultural conveyor in which a first auger section discharges into a second auger section while being longitudinally slidably relative to the second auger section to vary an overall length of the feed auger assembly between a loading hopper and the main conveyor. The resulting feed auger assembly is relatively large and requires a large support structure for lifting and moving the feed auger assembly.

SUMMARY OF THE INVENTION

According to one aspect of the invention there is provided a feed auger assembly for conveying particular material in a longitudinal direction, the feed auger assembly comprising:

a first auger housing extending in the longitudinal direction from an inlet end to a respective discharge end;

a first auger flight rotatably supported in the first auger housing so as to be arranged to convey the particulate material from the inlet end to the discharge end;

a second auger housing extending in the longitudinal direction from an intermediate end to an outlet end;

the first auger housing being concentrically received within the second auger housing so as to define an annular space therebetween which extends in the longitudinal direction;

a second auger flight rotatably supported in the second auger housing so as to be received in the annular space and so as to be arranged to convey the particulate material longitudinally through the annular space;

the discharge end of the first auger housing being arranged to discharge into the annular space between the intermediate end and the outlet end of the second auger housing; and the first auger housing being longitudinally slidable relative to the second auger housing in the longitudinal direction such that a distance between the inlet end of first auger housing and the outlet end of the second auger housing is adjustable.

The concentric arrangement of the first and second auger housings provides all the benefits of ease of placement of the loading hopper relative to the main conveyor in an agricultural conveyor as described in some of the above noted prior art, while still being operable through a full range of extendible motion, but in a manner which is much more compact in design than any prior art configuration. The feed auger assembly can thus take advantage of more compact and less complex mechanisms for lifting and swinging the feed auger assembly while also enabling the feed auger assembly to be applied to a greater variety of applications.

In the illustrated embodiment the feed auger assembly is used in combination with an agricultural conveyor assembly comprising:

a main conveyor tube;

a main conveying member in the main conveyor tube which is arranged to convey particulate material from an inlet end to an outlet end of the main conveyor tube;

a frame supporting the main conveyor tube at an upward incline from the inlet end to the outlet end in a working position of the main conveyor; and a loading hopper having a loading opening arranged to load the particulate material therein;

wherein the feed auger assembly extends in the longitudinal direction from the inlet end of the first auger housing in communication with the loading hopper to an outlet end of the second auger housing in communication with the inlet end of the main conveyor; and wherein the feed auger assembly is pivotally coupled to the main conveyor such that the feed auger assembly is pivotal relative to the main conveyor tube about a generally upright swing axis at the inlet end of the main conveyor.

Preferably the feed auger assembly is pivotally coupled to the inlet end of the main conveyor for pivotal movement about a second generally horizontal lift axis. In this instance a lifting member is preferably coupled between the main conveyor and the feed auger assembly in which the lifting member is coupled to the feed auger assembly adjacent the intermediate end of the second auger housing.

The first auger flight preferably spans a full length of the first auger housing in the longitudinal direction between the inlet end and the discharge end thereof.

Similarly, the second auger flight preferably spans a full length of the second auger housing in the longitudinal direction between the intermediate end and the outlet end of the second auger housing.

An outlet opening is preferably located in a bottom side of the first auger housing adjacent the discharge end which is arranged to receive the particulate material discharged from the first auger housing into the second auger housing therethrough.

An outlet opening is also preferably located in a bottom side of the second auger housing adjacent the outlet end which is arranged to receive the particulate material discharged from the second auger housing therethrough.

When the first auger housing is slidable relative to the second auger housing between opposed extended and retracted positions, the discharge end of the first auger housing is preferably arranged to discharge into the second auger housing through a full range of relative motion of the auger housings between the extended and retracted positions.

More particularly the first auger housing is preferably slidable relative to the second auger housing between an extended position in which the discharge end of the first auger housing is adjacent the intermediate end of the second auger housing and a retracted position in which the discharge end of the first auger housing is adjacent the outlet end of the second auger housing.

The first auger flight and the second auger flight are preferably connected to one another for common rotation about a common longitudinal axis of rotation.

There may be provided a hydraulic motor coupled to the first and second auger flights at the common longitudinal axis of rotation.

The assembly may further include an intermediate tubular housing concentrically received within the second auger housing such that the annular space receiving the second auger flight is defined between the intermediate tubular housing and the second auger housing. In this instance the first auger housing is preferably slidably received within the intermediate auger housing and the intermediate auger housing preferably includes a discharge slot arranged to communicate particulate material therethrough from the first auger housing to the second auger housing.

The intermediate tubular housing is preferably fixed in relation to the second auger housing.

The discharge slot preferably extends longitudinally along a bottom side of the intermediate tubular housing along a full length of the intermediate tubular housing.

The discharge slot may have a width in a circumferential direction which extends between ¼ and ½ a circumference of the intermediate tubular housing.

A longitudinal track may be supported on the intermediate tubular housing upon which a portion of the first auger housing is supported for longitudinal sliding movement relative to the second auger housing.

Preferably stop member at the discharge end of the first auger assembly which is arranged to limit extension of the first auger housing relative to the second auger housing beyond a prescribed extension.

A support shaft may be telescopically received into the first auger flight at the discharge end of the first auger housing in which the support shaft spans a full length of the second auger housing so as to be longitudinally fixed relative to the second auger housing and slidable into the first auger flight as the first auger housing is retracted into the second auger housing. More particularly the support shaft preferably comprises a drive shaft keyed to rotate with the first auger flight.

Preferably a bearing member rotatably supports the drive shaft at the outlet end of the second auger housing.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
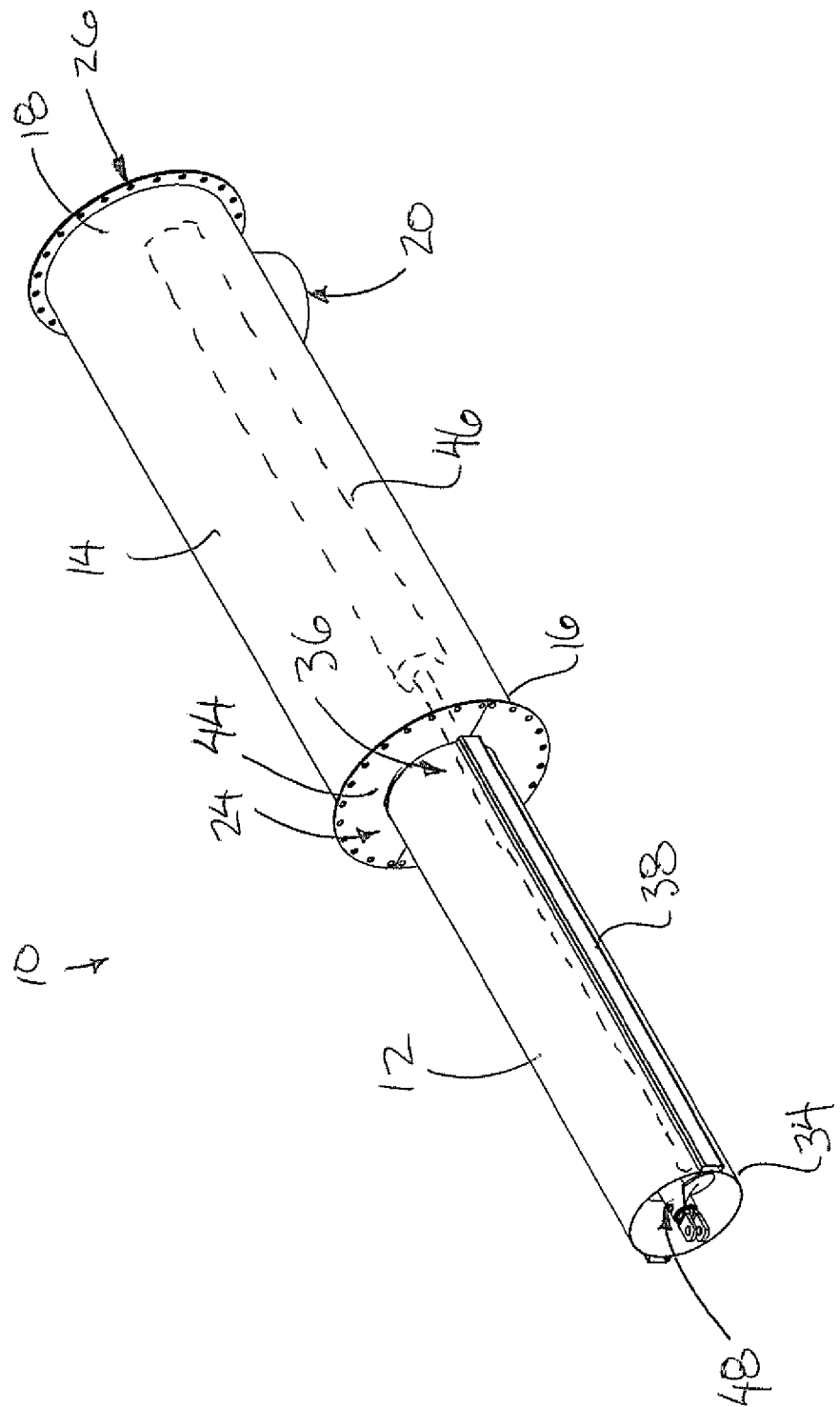
FIG. 1 is a perspective view of the feed auger assembly in an extended position.
Figure 2:
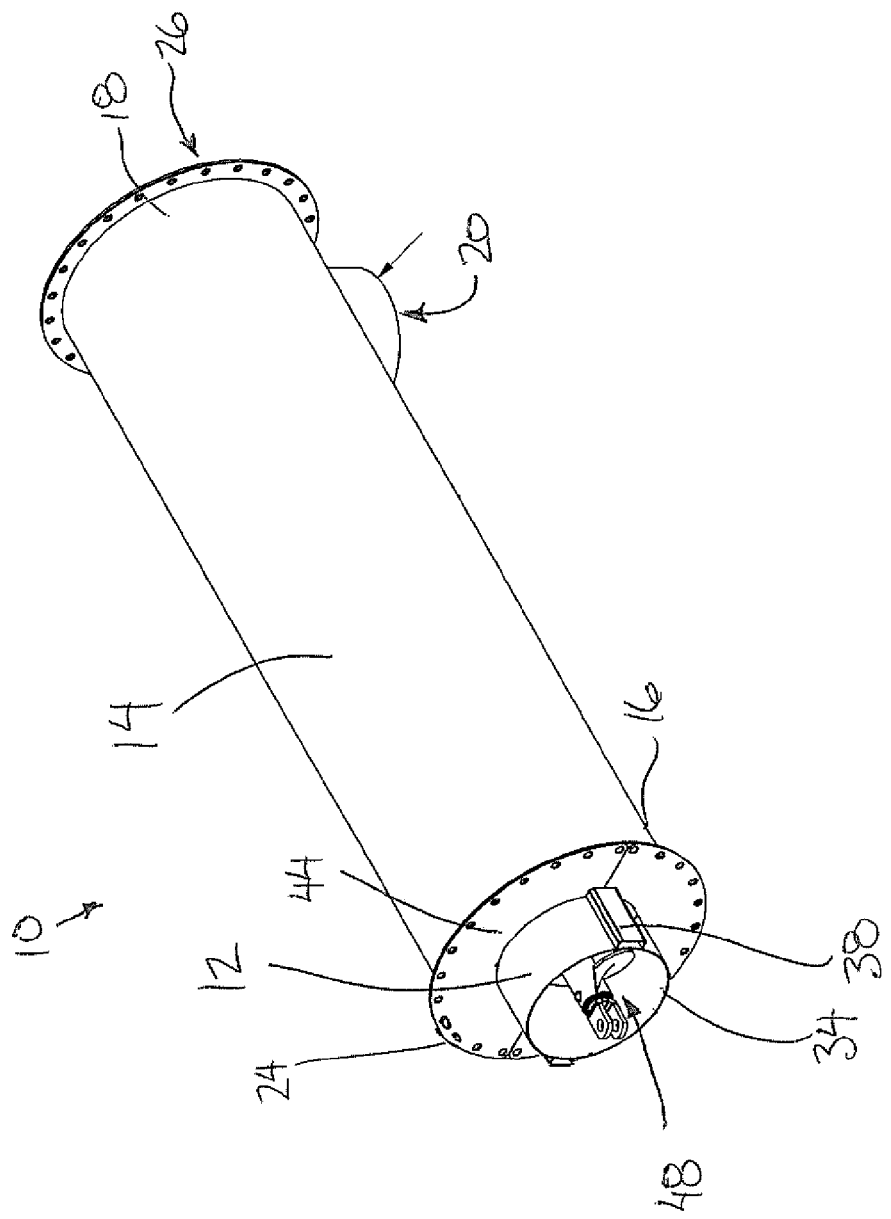
FIG. 2 is a perspective view of the feed auger assembly in a retracted position.
Figure 3:
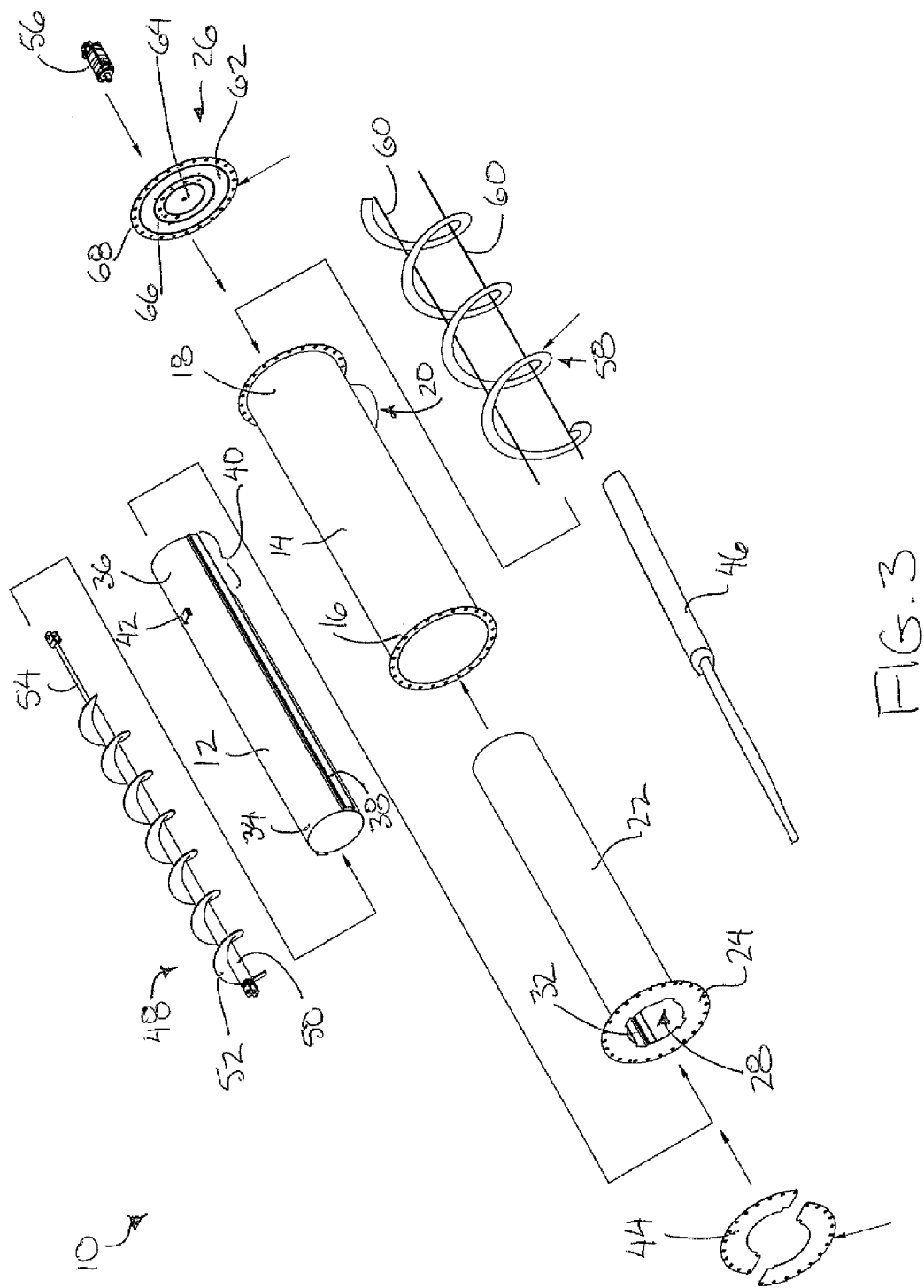
FIG. 3 is an exploded perspective view of the components of the feed auger assembly.
Figure 4:
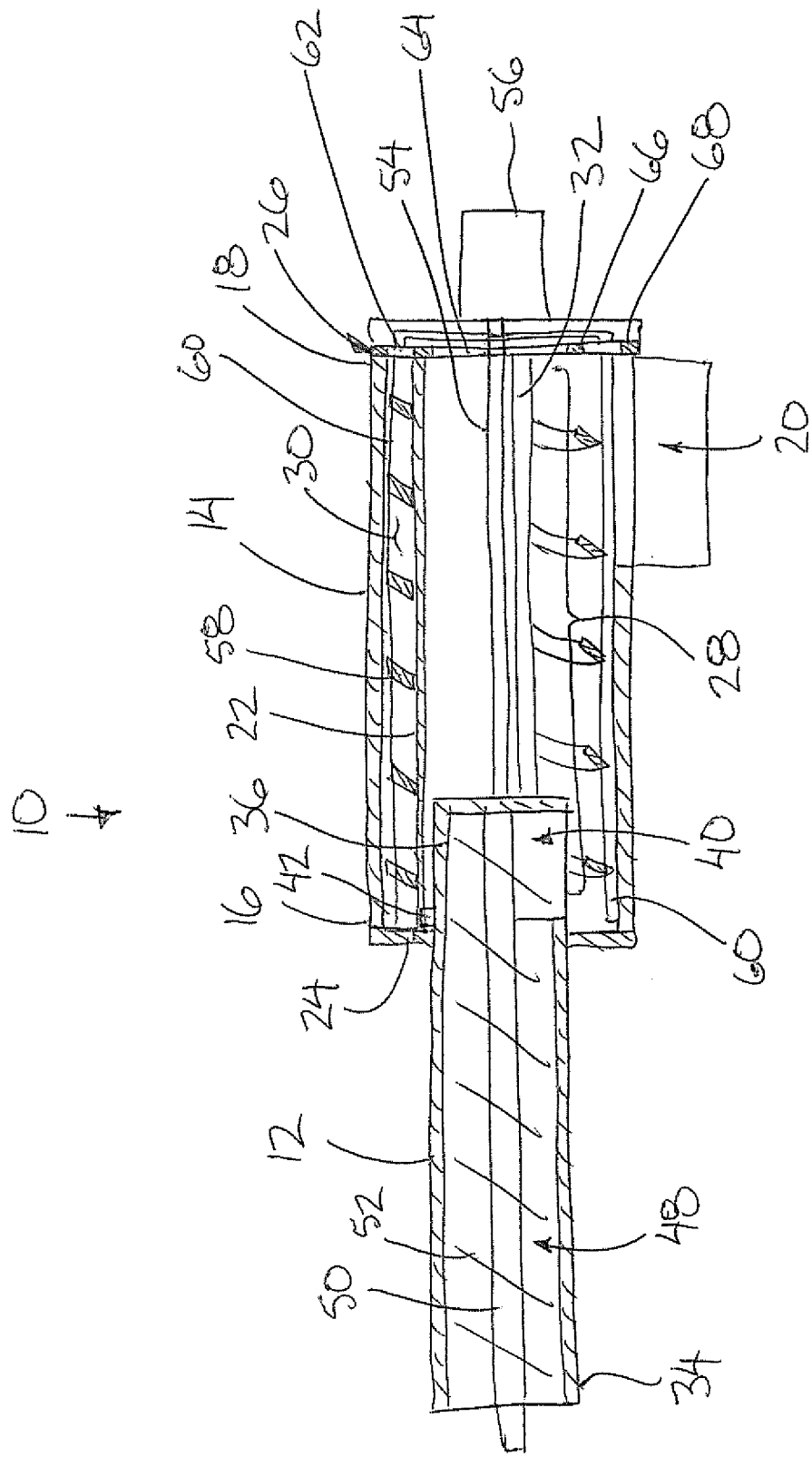
FIG. 4 is a vertical cross section along a longitudinal axis of the feed auger assembly.

Referring to the accompanying figures there is illustrated a feed assembly generally indicated by reference numeral 10. The feed auger assembly 10 is particularly suited for use a feed section of an agricultural conveyor for conveying particulate material, for example grain, seed or other similarly particulate materials. In one example, the feed auger assembly may be used in place of the swing auger assembly in the conveyor assembly described in the applicant's co-pending U.S. patent application Ser. No. 12/967,271, the contents of which are hereby incorporated by reference.

Typically the agricultural conveyor includes a main conveyor comprised of a main conveyor tube which is elongate in a respective longitudinal direction between an inlet end and an outlet end. A main conveying member within the main conveyor tube typically comprises an auger which is rotatable about a longitudinal axis thereof to convey the particulate material from the inlet end to the outlet end. The main conveyor also comprises a frame which supports the main conveyor tube on wheels for rolling movement generally in the longitudinal direction of the conveyor and which further comprises a hitch connection coupled to the main conveyor tube adjacent the inlet end for connection to a towing vehicle.

The feed auger assembly is intended to be coupled to the inlet end of the main conveyor tube to assist in loading particulate material into the main conveyor. The feed auger assembly is connected so as to be pivotal about an upright swing axis at the inlet end of the main conveyor tube as well as being pivotal about a generally horizontal lift axis at the outlet end of the feed auger assembly which is coupled to the inlet end of the main conveyor tube.

The conveyor assembly to which the feed auger assembly is suited, typically also comprises a loading hopper for loading the particulate material into the inlet end of the swing auger assembly. Loading hoppers of this type are typically connected to the inlet end of the swing auger assembly for movement therewith about the upright swing axis and the lateral lift axis while being relatively low in profile for being received under the discharge of various implements such as the discharge chute under particulate material carrying trailers for example.

The feed auger assembly 10 generally includes a first inner auger housing 12 arranged to be telescopically received within a second outer auger housing 14 so as to be slideable relative to one another in a longitudinal conveying direction of the assembly to vary the overall length of the assembly between inlet and outlet ends thereof in the longitudinal direction.

The second auger housing 14 is a generally cylindrical tubular member extending in a longitudinal direction between an intermediate end 16 and an outlet end 18. The housing is enclosed at the outlet end and is open at the intermediate end through which the first auger housing 12 is telescopically received. An outlet opening 20 is provided in the wall of the second auger housing 14 at the bottom side adjacent the outlet end. The outlet opening is generally circular having an area which corresponds approximately to the cross sectional area of the inner passage thru the tubular member forming a housing.

The assembly further includes an intermediate housing 22 which is similarly in the form of a generally cylindrical tubular member spanning the full length of the second auger housing 14 between opposing ends thereof in a longitudinal direction. An annular flange 24 is mounted at one end corresponding to the intermediate end of the auger housing 14 so as to span the radial gap between the intermediate housing and the outer housing 14 at the intermediate end to fix the intermediate housing relative to the second auger housing 14 such that they are fixed in the longitudinal direction and fixed against rotation relative to one another.

A bearing disk 26 is supported at the opposing end of the intermediate housing 22 to support the other end of the intermediate housing relative to the outlet end 18 of the outer housing 14. Details of the bearing disk will be described in further detail below.

The intermediate housing 22 also includes a discharge slot 28 formed in the bottom side to span the full length of the housing. The slot 28 has a width in a circumferential direction in the illustrated embodiment which corresponds to near half the circumference of the tube forming the intermediate housing such that the bottom side of the intermediate housing is in full open communication with a resulting annular space 30 defined between the intermediate housing 22 and the outer housing 14 along the full length in the longitudinal direction of the housing.

The intermediate housing also includes two diametrically opposed channels 32 which extend along opposing sides of the housing on the inner surface thereof along a full length in the longitudinal direction to define a longitudinal track providing sliding support to the first auger housing 12 telescopically received therein.

The first inner auger housing 12 also comprises a generally cylindrical tubular member having a length which is near or slightly greater than the length of the outer housing 14. The inner housing 12 stands in the longitudinal direction between an inlet end 34 and an opposing discharge end 36 which is received between the opposing ends of the outer housing in use. The diameter of the first housing 12 is arranged to be concentrically received within the intermediate housing 22 which is in turn concentrically received within the outer housing 14. A pair of rails 38 are fixed along the outer sides of the tubular member forming the inner housing 12 so as to be diametrically opposite one another and to extend the full length in the longitudinal direction. The rails 38 are adapted for being received in respective ones of the channels 32 forming the longitudinal track within the intermediate housing to provide support along the full length of the inner housing 12 when slideably received into the intermediate housing 22.

The inner housing 12 is open at the inlet end so as to be suitable for connection to the discharge of a loading hopper of the agricultural conveyor with which the feed auger assembly is intended to be used. Accordingly particulate material loaded into the loading hopper is fed through the discharge of the hopper into the inlet end of the inner housing 12.

The inner housing 12 also includes an outlet opening 40 formed in the wall of the housing at the bottom side adjacent to the discharge end. The cross-sectional area of the opening is equal to or greater than the cross-sectional area of the passage through the inner housing 12.

The inner housing 12 is supported for longitudinal sliding movement relative to the intermediate housing and the surrounding outer housing 14 for movement between a retracted position and extended position. In the retracted position the discharge end of the first housing 12 is located adjacent to the outlet end of the second outer housing 14. Alternatively in the extended position the discharge end of the inner housing 12 is spaced from the outlet end so as to be adjacent to the intermediate end 16 of the outer housing 14 such that the overall length of the feed auger assembly is longer in the extended position then in the retracted position. The overall length of the assembly is considered to be the longitudinal distance between the inlet end 34 coupled to a loading hopper and the outlet end 18 pivotally coupled to the inlet of a main conveyor.

A stop member 42 is provided in the form of one or more lugs mounted on the exterior surface of the inner housing so as to be spaced in the longitudinal direction from the discharge end of the inner housing by a distance corresponding approximately to the overall length of the outlet opening 40 in the bottom side of the inner housing 12. The stop member 42 is arranged to abut a stop plate 44 mounted at the inlet end of the inner housing 12 in the extended position to prevent longitudinal sliding of the inner housing 12 outwardly in the longitudinal direction beyond the prescribed extended position.

Position of the inner housing relative to the outer housing is typically controlled by a suitable linear actuator (not shown) which can be mounted externally alongside the outer housing 14 to be anchored to the outer housing at one end and anchored to the inlet end of the inner housing at the opposing end. Extension and retraction of the actuator would thus effectively extend and retract the inner housing relative to the outer housing.

The assembly 10 further comprises a first auger flight 48 which is mounted within the hollow interior of the inner housing 12 to span the full length of the inner housing. The flight 48 includes a hollow tubular shaft portion 50 and a flight portion 52 joined to the shaft along the full length thereof such that the outer diameter of the flight portion corresponds approximately to the inner diameter of the tubular member forming the inner housing 12. The flight is supported within the inner housing such that the auger flight is slidable in the longitudinal direction together with the first housing relative to the second housing while being rotatable relative to the first housing so as to be arranged to convey particulate materials thru the first housing in the longitudinal direction from the inlet end to the outlet opening at the discharge end.

The hollow shaft portion 50 cooperates with a drive shaft 54 which is slidably received into the hollow shaft portion thru the discharge end of the first housing. The drive shaft 54 and the hollow shaft 50 have a mating cross section so as to be keyed for rotation together while allowing the drive shaft to be extended and retracted slidably relative to the first auger flight. The drive shaft spans the full length of the second outer housing and is rotatably supported at one end opposite the flight 48 by the bearing disk 26 at the outlet end of the second outer housing 14. The bearing disk fixes the longitudinal position of the drive shaft while supporting the drive shaft for rotation relative to the auger housing.

By supporting a hydraulic motor 56 externally of the outer housing 14 at the outlet end 18 thereof in connection with the end of the drive shaft 54 protruding longitudinally outward thru the bearing disk, the motor 56 is suitably arranged for driving rotation of the drive shaft which in turn drives the rotation of the first auger flight 48 keyed to rotate therewith. As the first auger housing is longitudinally displaced relative to the second auger housing, the drive shaft is correspondingly telescopically received within the hollow shaft portion of the first auger flight so that the motor is arranged to continue to drive rotation of the first auger throughout the full extension and retracting motion of the housings relative to one another.

A second auger flight 58 is mounted within the annular space defined between the first and second housing, and more particularly within the annular space defined between the intermediate housing and the outer housing 14. The second auger flight comprises a helical member received within the annular space to substantially span the full radial width of the annular space while also spanning the full length of the annular space in the longitudinal direction between opposing ends of the second housing.

Support rods 60 are mounted parallel to the axis of rotation at circumferentially spaced positions about the second auger flight providing support between adjacent windings or coils of the helical member forming the auger flight 58. The support rods 60 or the helical member or both are joined to a rotating portion 62 of the bearing disk 26.

More particularly the bearing disk comprises a circular central portion 64 rotatably supporting and receiving the drive shaft therethrough. The central portion is surrounded by a first mounting ring 66 having a diameter corresponding to the diameter of the intermediate tube for mounting to the discharge end of the intermediate tube while remaining rotatable relative to the drive shaft received thru the central portion.

The rotating portion 62 to which the seconds auger flight is connected also comprises an annular member which surrounds the first mounting ring 66 in rotatable relationship therewith. The rotating portion 62 is coupled to the drive shaft such that the first and second auger flights are directly connected together for common rotation together about the common longitudinal axis of the assembly. The rotating portion is in turn surrounded by a second mounting ring 68 having a diameter corresponding to the diameter of the outer housing 14 for fastening to the discharge end of the outer housing while supporting the rotating portion 62 for relative rotation about the longitudinal axis.

In use, a user positions the loading hopper in a desirable location by pivoting the feed auger assembly relative to the main auger of the agricultural conveyor about both an upright swing axis and a generally horizontal lift axis at the outlet end in proximity to the inlet end of the main auger. The inner housing 12 is also extended and retracted relative to the outer housing 14 to assist in positioning the loading hopper in a desirable location. Regardless of the resulting position of the inner housing relative to the outer housing, use of the hydraulic motor 56 drives the rotation of the flights together such that material discharged from the loading hopper into the inlet end of the inner housing is conveyed by the first auger flight 48 from the inlet end to the discharge end. The particulate material is then discharged thru the outlet opening in the first inner auger housing 12 thru the outlet opening and the discharge slot of the intermediate housing into the annular space defined between the intermediate housing and the outer housing. Particulate material received within the annular space is then conveyed in the longitudinal direction by the second auger flight 58 from the discharge end of the inner housing 12 to the outlet end of the outer housing 14 for discharging the particulate materials thru the outlet opening into the main conveyer.

When providing controls for lifting the feed auger assembly relative to the main auger including a lift member, for example a hydraulically actuated linear piston cylinder assembly, the lift member is preferably connected to the top side of the outer housing 14 adjacent the intermediate end 16 thereof.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A feed auger assembly for conveying particular material in a longitudinal direction, the feed auger assembly comprising:
    a first auger housing extending in the longitudinal direction from an inlet end to a respective discharge end;
    a first auger flight rotatably supported in the first auger housing so as to be arranged to convey the particulate material from the inlet end to the discharge end;
    a second auger housing extending in the longitudinal direction from an intermediate end to an outlet end;
    the first auger housing being concentrically received within the second auger housing so as to define an annular space between the first auger housing and the second auger housing which extends in the longitudinal direction;
    a second auger flight rotatably supported in the second auger housing within said annular space between the first auger housing and the second auger housing so as to be arranged to convey the particulate material longitudinally through the annular space towards the outlet end;
    the discharge end of the first auger housing being arranged to discharge into the annular space between the intermediate end and the outlet end of the second auger housing; and
    the first auger housing being longitudinally slidable relative to the second auger housing in the longitudinal direction such that a distance between the inlet end of first auger housing and the outlet end of the second auger housing is adjustable.

2. The feed auger assembly according to claim 1 in combination with an agricultural conveyor assembly comprising:
    a main conveyor tube;
    a main conveying member in the main conveyor tube which is arranged to convey particulate material from an inlet end to an outlet end of the main conveyor tube;

a frame supporting the main conveyor tube at an upward incline from the inlet end to the outlet end in a working position of the main conveyor; and a loading hopper having a loading opening arranged to load the particulate material therein;

the feed auger assembly extending in the longitudinal direction from the inlet end of the first auger housing in communication with the loading hopper to an outlet end of the second auger housing in communication with the inlet end of the main conveyor; and the feed auger assembly being pivotally coupled to the main conveyor such that the feed auger assembly is pivotal relative to the main conveyor tube about a generally upright swing axis at the inlet end of the main conveyor.

3. The feed auger assembly according to claim 2 wherein the feed auger assembly is pivotally coupled to the inlet end of the main conveyor for pivotal movement about a second generally horizontal lift axis and wherein there is provided a lifting member coupled between the main conveyor and the feed auger assembly, the lifting member being coupled to the feed auger assembly adjacent the intermediate end of the second auger housing.

4. The feed auger assembly according to claim 1 wherein the first auger flight spans a full length of the first auger housing in the longitudinal direction between the inlet end and the discharge end thereof.

5. The feed auger assembly according to claim 1 wherein the second auger flight spans a full length of the second auger housing in the longitudinal direction between the intermediate end and the outlet end of the second auger housing.

6. The feed auger assembly according to claim 1 wherein there is provided an outlet opening located in a bottom side of the first auger housing adjacent the discharge end which is arranged to receive the particulate material discharged from the first auger housing into the second auger housing therethrough.

7. The feed auger assembly according to claim 1 wherein there is provided an outlet opening located in a bottom side of the second auger housing adjacent the outlet end which is arranged to receive the particulate material discharged from the second auger housing therethrough.

8. The feed auger assembly according to claim 1 wherein the first auger housing is slidable relative to the second auger housing between opposed extended and retracted positions, the discharge end of the first auger housing being arranged to discharge into the second auger housing through a full range of relative motion of the auger housings between the extended and retracted positions.

9. The feed auger assembly according to claim 1 wherein the first auger housing is slidable relative to the second auger housing between an extended position in which the discharge end of the first auger housing is adjacent the intermediate end of the second auger housing and a retracted position in which the discharge end of the first auger housing is adjacent the outlet end of the second auger housing.

10. The feed auger assembly according to claim 1 wherein the first auger flight and the second auger flight are connected to one another for common rotation about a common longitudinal axis of rotation.

11. The feed auger assembly according to claim 10 wherein there is provided an hydraulic motor coupled to the first and second auger flights at the common longitudinal axis of rotation.

12. The feed auger assembly according to claim 1 further comprising an intermediate tubular housing concentrically received within the second auger housing such that the annular space receiving the second auger flight is defined between the intermediate tubular housing and the second auger housing, the first auger housing being slidably received within the intermediate auger housing, and the intermediate auger housing including a discharge slot arranged to communicate particulate material therethrough from the first auger housing to the second auger housing.

13. The feed auger assembly according to claim 12 wherein the intermediate tubular housing is fixed in relation to the second auger housing.

14. The feed auger assembly according to claim 12 wherein the discharge slot extends longitudinally along a bottom side of the intermediate tubular housing along a full length of the intermediate tubular housing.

15. The feed auger assembly according to claim 14 wherein the discharge slot has a width in a circumferential direction which extends between $1/4$ and $1/2$ a circumference of the intermediate tubular housing.

16. The feed auger assembly according to claim 12 further comprising a longitudinal track supported on the intermediate tubular housing upon which a portion of the first auger housing is supported for longitudinal sliding movement relative to the second auger housing.

17. The feed auger assembly according to claim 16 wherein there is provided a stop member at the discharge end of the first auger assembly which is arranged to limit extension of the first auger housing relative to the second auger housing beyond a prescribed extension.

18. The feed auger assembly according to claim 1 wherein there is provided a support shaft telescopically received into the first auger flight at the discharge end of the first auger housing, the support shaft spanning a full length of the second auger housing so as to be longitudinally fixed relative to the second auger housing and slidable into the first auger flight as the first auger housing is retracted into the second auger housing.

19. The feed auger assembly according to claim 18 wherein the support shaft comprises a drive shaft keyed to rotate with the first auger flight.

20. The feed auger assembly according to claim 19 wherein there is provided a bearing member rotatably supporting the drive shaft at the outlet end of the second auger housing.

* * * * *